(No Model.)  
2 Sheets—Sheet 1.
E. P. GENESTE.
PORTABLE BAKE OVEN.
No. 296,284.  
Patented Apr. 1, 1884.
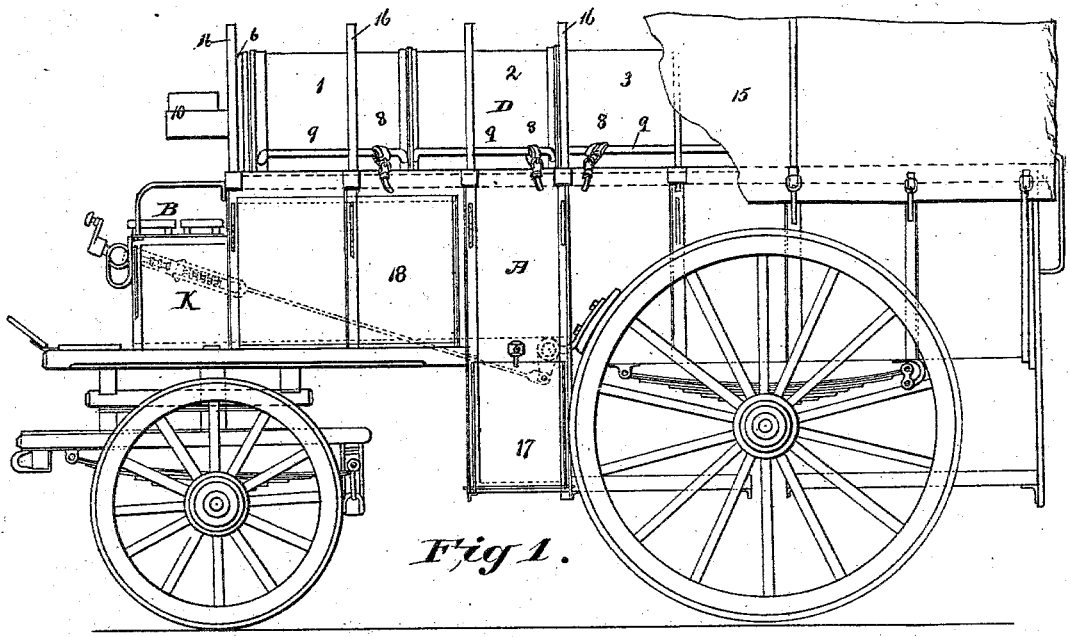
Fig. 1.
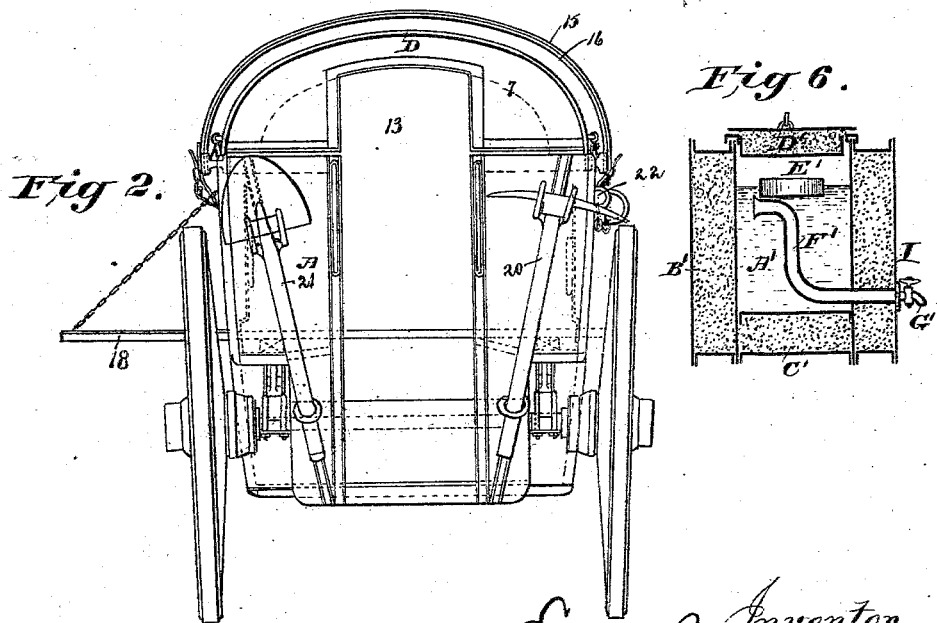
Fig. 2.  
Fig. 6.
Attest:  
Geo. T. Smallwood.  
C. J. Hedrick
Inventor  
Eugène Paul Geneste  
by A. Pollok  
his attorney.

(No Model.) 2 Sheets—Sheet 2.
E. P. GENESTE.
PORTABLE BAKE OVEN.
No. 296,284. Patented Apr. 1, 1884.
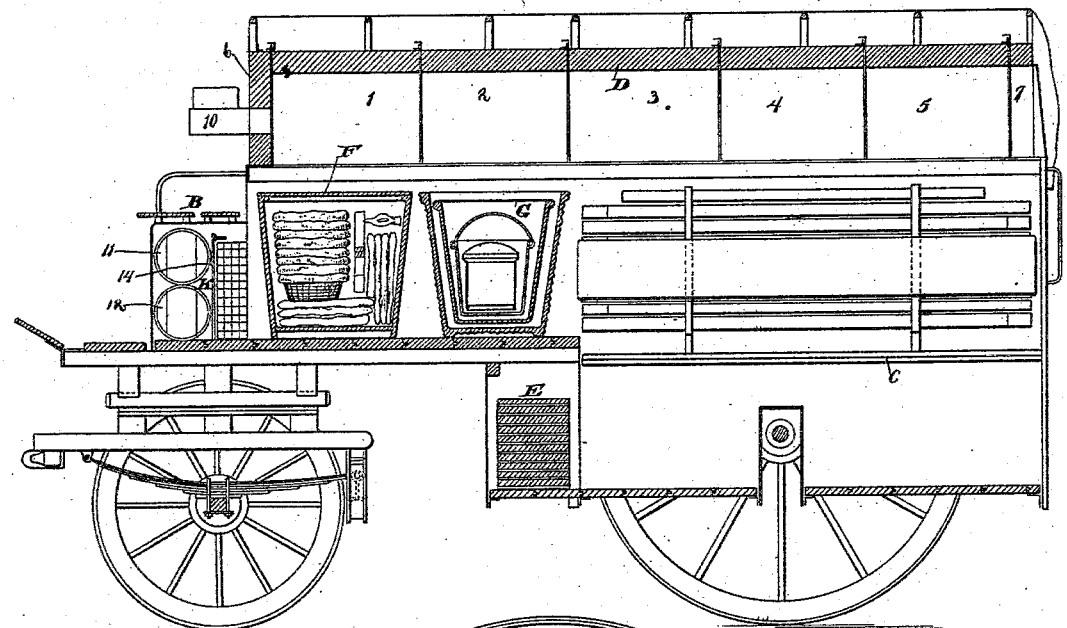
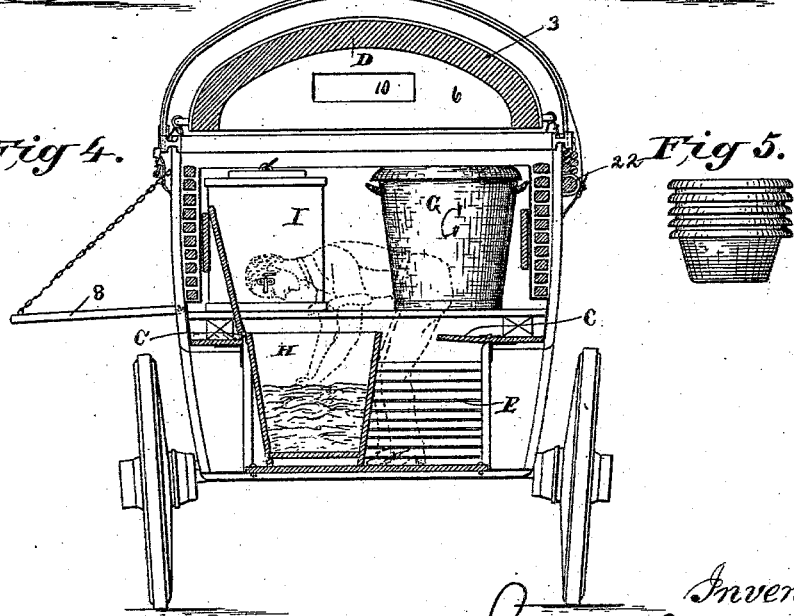 
Attest:
Geo. T. Smallwood.
C. J. Hedrick
Inventor
Eugéne Paul Geneste
by A. Pollok
his attorney.

UNITED STATES PATENT OFFICE.

EUGÈNE PAUL GENESTE, OF PARIS, FRANCE.

PORTABLE BAKE-OVEN.

SPECIFICATION forming part of Letters Patent No. 296,284, dated April 1, 1884.

Application filed May 8, 1883. (No model.)

*To all whom it may concern:*

Be it known that I, EUGÈNE PAUL GENESTE, a citizen of the Republic of France, and residing in Paris, France, have invented a Rolling Bake-House, more especially applicable to the use of armies and to other like purposes, of which the following is a specification.

This invention relates to an improved portable apparatus for manufacturing bread for the use of armies during a campaign or for other similar uses, and constituting a self-contained portable or traveling bake-house or bread-factory provided with all the necessary appliances for the preparation and baking of loaves or rations of bread in the field, as hereinafter described.

The apparatus heretofore employed for baking bread or rations for the use of armies during a campaign are of various descriptions—such, for example, as the apparatus known in France as the "Sespinasse oven," as well as other portable ovens—ovens that can be taken to pieces for traveling, and the ovens already patented by me, which have afforded good results in practical operation. These ovens, though valuable in themselves in respect of the results obtained and the difficulties to be overcome, only fulfill one part of the requirements of the case—that is to say, the actual baking of the bread—and do not facilitate the preparation of the dough, the transport of the materials, and other accessory operations. The loss of time and difficulties attending the fitting up of temporary bake-houses are only partially obviated, and in addition to fitting up the oven it is necessary to provide for the transport of a large quantity of materials, and in most cases the men are already fatigued before they can proceed with the tedious and difficult operation of preparing the leaven. In order to remedy this disadvantageous condition, I have invented a vehicle or traveling apparatus which may be advantageously employed in combination with the ovens capable of being taken to pieces, or the portable oven forming the objects of my previous inventions, and may, if desired, be constructed to carry the said ovens. This combination constitutes a self-contained traveling bake-house completely provided with all the necessary appliances or utensils, the oven, and accommodation for the men. The leaven is thus enabled to be prepared and attended to without inconvenience during the march, and on arriving at the halting-place it is simply necessary to place the oven in position upon the ground, and to erect the tents for the reception of the kneading-trough and other accessory appliances, in order to commence the operation of bread-making without delay. The vehicle is then available for other purposes—such as transporting fire-wood or flour, or for carrying the bread that has been made. For the latter purpose temporary wooden shelves are employed, capable of being rapidly placed in position in the vehicle, which thus, after serving to transport the men and materials, is converted into a vehicle specially adapted for sweating or drying and carrying the bread.

In order that the said invention may be fully understood, I shall now proceed more particularly to describe the same, and for that purpose shall refer to the several figures on the annexed sheet of drawings, the same letters of reference indicating corresponding parts in all the figures.

Figure 1 is a side elevation, and Fig. 2 is an end elevation, of a traveling bread-making apparatus or vehicle constructed according to this invention. Figs. 3 and 4 are respectively longitudinal and transverse sections of the same. Figs. 5 and 6 are respectively separate illustrations of certain pans and a heat-retaining vessel or chamber of improved construction, hereinafter described.

The vehicle is composed of a metal case or body, A, supported upon springs and wheels of army pattern. At the fore part of the body is provided a seat, B, capable of accommodating two men with their equipment, a gun or rifle rest, whip-holder, lamp, brake-handle, and other accessories. The space inside the body contains sundry fittings and objects, hereinafter specified. At the hinder part of the vehicle are provided seats C for five men. Access to this part of the vehicle is given by the doorway in the end. An oven, D, constructed according to my former invention, is placed at the top and forms the roof of the vehicle, being composed of five bays or sections, 1 2 3 4 5, and two end pieces, 6 7. The sections are attached to the wagon-frame by loops 8, strapped around the handles 9, which also enable the said parts readily to be lifted off. In the end piece 6 is a stove-pipe elbow, 10. Two lengths of pipe, 11 12, to be placed in series above the elbow, to form the chimney when the oven is set up, are stowed away in the box K under the driver's seat. In the end piece 7 is an opening, 13, (see Fig. 2,) for the door 14, which is stowed in transit in the box K. Above the oven-sections is a tilt or tarpaulin, 15, carried by iron ribs 16, preferably eight in number, and forming a water-proof cover to the vehicle. In a boot or receptacle under the vehicle are arranged the slabs or panels E, which form the bottom or floor of the oven. Access to the boot is given through the side door 17, which is hinged at the bottom, as shown in Fig. 1. The fore part of the body has also a side door 18, which can be let down at will, and is then sustained in a horizontal position by chains, as shown in Figs. 2 and 4.

First. On the floor of the fore part of the body is placed a kneading-trough, F, with its cover in two parts, one of which forms a board or table. This kneading-trough contains a cistern or filter, two brigadiers' tent-cloths, forty tent-pegs, two mallets, four bolts for fixing the tents, a pair of dough-scales, two dough-knives, a hammer-headed hatchet with handle, an axe with handle, fifty canvas-mounted pans or basins, two bakers' shovels or peels, handles for placing the dough in the oven, two of the same for taking the bread out of the oven, one fire-shovel, a standard or support for the dough-scales, two short shovel or peel handles, five pairs of overall-trowsers, and two double keys for six-sided nuts. A large leaven-basket, G, is arranged at one side of the vehicle, behind the kneading-trough F. It contains one small leaven-basket, one copper kettle capable of holding, say, about five and a half gallons, one pail, one lantern, one oil-bottle and wicks, and two small canvas beds. In this part of the vehicle, on the opposite side thereof, is placed a heat-retaining vessel, I, hereinafter described, capable of containing, say, about five and a half gallons. This vessel is employed to keep water hot for a period of about twenty-four hours, to be used for the leaven during the march.

Second. A small kneading-trough, H, for working the leaven during the march is carried between the receptacle for the floor E of the oven and the box or cover of the axle.

Tent-poles and poles for the drying or sweating racks, together with a pick-axe, spade, and rake, and such other tools and contrivances (a grease-box, for example) are disposed in convenient places. As shown, the pick-axe 20 and spade 21 are supported at the rear of the vehicle, and one of the tent-poles, 22, together with some smaller poles or handles, is slung on the outside.

The vehicle or apparatus constructed and arranged and fitted up with the various articles and appliances as hereinbefore described and enumerated constitutes a portable or traveling bread-factory capable of fulfilling all the requirements of an army in the field, or of any other similar body of men which has to move frequently from place to place under the same conditions.

It will be observed that the convenient and orderly arrangement of the articles and the accommodation provided for the necessary men enable all the operations preliminary to the kneading of the dough and the baking of the bread to be conveniently proceeded with when in the field. The dough may even be kneaded or worked up inside the vehicle when there is no opportunity for fitting up the kneading-trough under a tent. In this case, the trough is placed across the vehicle, so as to enable two men to work without inconvenience, although I prefer to fit out the traveling bread-factory with the articles which I have enumerated, in order to provide against all contingencies. It is evident that the nature and relative number of the articles may be varied, and that the grouping and arrangement of the said articles may also be modified, without affecting the principle of my invention. In like manner, the dimensions of the vehicle may be modified according to requirements, as well as the nature of the materials of which it is composed. Instead of being combined with the oven capable of being taken to pieces, as hereinbefore described, the vehicle may be employed in combination with a portable oven constructed on any other principle.

The pans hereinbefore referred to, and which are represented as packed together in Fig. 5, are made of galvanized-iron wire covered with cloth or canvas. These pans are lighter than basket-work vessels, and also present the additional and important advantage over the latter of taking up much less room when packed together, owing to the thinness of the wire-work employed in their construction.

The vessel for retaining heat, as shown in Fig. 6, is also of special and improved construction. This vessel consists of a chamber, A', and an outer case, B', so arranged as to form a space between the walls of the said chamber and the outer case, which space is filled with silicate cotton. The top D' and bottom C' of the chamber are also double or hollow and packed with silicate cotton or other suitable heat-retaining material. An india-rubber tube, F', open at its upper end and attached to a float, E', draws off the water at the hottest part and discharges it through a cock, G'. This vessel is capable of keeping water hot for about twenty-four hours, which water may be utilized for reviving the leaven during the march. These articles—namely, the wire pans and heat-retaining vessel—are most advantageously employed in combination with the portable apparatus hereinbefore described; but it is evident that they may be employed in other baking establishments.

I am aware that heretofore a baker's oven has been mounted on wheels, the said oven comprising a shell in which are formed fire-places and smoke-flues, together with a baking-chamber, which is surrounded by the flues. Such an apparatus differs, essentially, from the present invention. The former is simply an oven complete for firing, mounted on wheels, whereas in the latter the vehicle is adapted to ordinary purposes—the transportation of articles and men—the oven-sections having to be removed and set up for baking. With the new apparatus the weight to be transported is much less in comparison to the baking capacity.

I claim—

1. The combination, with the vehicle, of the arched oven-sections adapted to rest on the sides of the said vehicle, and removably secured thereto, whereby room is obtained in the vehicle beneath the oven for carrying men, bread-making utensils, and other articles, substantially as described.

2. The traveling bread-factory comprising, in combination with the vehicle constructed substantially as described, and carrying the bread-making utensils, and being provided, further, with seats for men, the arched oven-sections adapted to rest on the sides of the said vehicle, and removably secured thereto, room being left beneath the same for the said utensils and for the men to be carried, substantially as described.

In testimony whereof I have signed my name to this specification in the presence of two subscribing witnesses.

EUGÈNE PAUL GENESTE.

Witnesses:
JOSEPH DELAGE,
ROBT. M. HOOPER.